Feb. 24, 1970   S. F. GILMAN ET AL   3,497,785
MOTOR STARTING AND RUNNING SYSTEM FOR REFRIGERATION APPARATUS
Filed June 9, 1967

INVENTORS.
STANLEY F. GILMAN.
RUSSELL E. WOOD.
BY
*Frank N. Decker Jr.*
ATTORNEY.

United States Patent Office 3,497,785
Patented Feb. 24, 1970

3,497,785
MOTOR STARTING AND RUNNING SYSTEM FOR REFRIGERATION APPARATUS
Stanley F. Gilman, 100 Valerie Circle, Fayetteville, N.Y. 13066, and Russell E. Wood, 5816 Acton St., East Syracuse, N.Y. 13057
Filed June 9, 1967, Ser. No. 644,899
Int. Cl. H02k 17/08; H02p 1/44
U.S. Cl. 318—221                    1 Claim

ABSTRACT OF THE DISCLOSURE

A refrigeration system single phase alternating current motor starting system wherein line alternating current is passed to the motor main winding and to a phase control circuit which passes a fractional portion of each half cycle of the line alternating current to the motor auxiliary winding, thereby providing an alternating current out of phase with the line alternating current passed to the main winding whereupon a resultant torque is developed for starting and running the motor.

BACKGROUND OF THE INVENTION

This invention relates to refrigeration apparatus single phase alternating current motor starting and running systems.

Refrigeration systems include equipment such as fans, pumps, and reciprocating, rotary and centrifugal compressors. To effect the transfer of various liquids and gases such as air, water or refrigerants in refrigeration systems, it is necessary to put this equipment into motion by prime movers, and in this instance, electric motors.

Due to the wide availability of single phase power and suitability for meeting load torque requirements of driven refrigeration equipment, single phase alternating current electric motors are commonly used to drive the various components in refrigeration apparatus. Inherent in the structure of such motors is the requirement that auxiliary means be provided to produce a force or torque to start and accelerate single phase motors to full load speed. This is more readily understood by a comparison with polyphase motors.

Polyphase motors have separate and uniformly distributed windings in the stator or outer stationary part of the motor, one for each phase. The current in the windings alternates continually and progessively to produce a revolving magnetic field which results in torque that turns the rotor or inner rotating part of the motor. However, in single phase induction motors, there is only one main winding in the stator. Introduction of alternating current would produce a magnetic field with alternating polarity, but the magnetic field would not revolve; it would be on "dead center." Therefore, an auxiliary means must be provided to produce the required starting torque.

Various auxiliary means well-known in the art have been employed for starting single phase motors. The different auxiliary means constitute a basis for classification of single phase motors. Some of the types of starting means are resistance split phase, capacitor-start induction-run, capacitor-start capacitor-run and permanent split-capacitor motors. Of these, capacitor motors have been popular for use in refrigeration systems, and when starting requirements are low, the permanent split-capacitor motor is commonly used to its high efficiency and quiet running characteristics.

To produce starting torque in the above types of single phase motors, an auxiliary winding is provided on the stator displaced from the main winding and alternating current that is out of phase with the current in the main winding is passed through the auxiliary winding. Heretofore, a preferable means of obtaining current phase displacement for producing starting torque has been by interposing a capacitor in the auxiliary winding. The use of capacitors is not altogether satisfactory however, as the requirement of withstanding heavy, continuous duty has presented limitations on this means with respect to size and quality selection sufficient to meet high commercial standards. Although capacitor motor arrangements generally have been quite successful for starting and running single phase motors in refrigeration systems, there is a demand for an arrangement which avoids the use of conventional starting capacitors.

Accordingly, it is an object of this invention to provide a refrigeration system having an improved starting arrangement.

It is a further object to obtain an improved motor starting and running system for refrigeration apparatus electric motors.

SUMMARY OF THE INVENTION

In accordance with a preferred embodiment of this invention, a refrigeration system, including a condenser, expansion means, evaporator and compressor, which employs a single phase alternating current compressor motor is provided with a phase control circuit for starting and running the motor.

In order to develop a starting torque in single phase alternating current motors, there must be a phase displacement in the phase of the current supplied to the motor auxiliary winding from the phase of the current supplied to the motor main winding. The phase control circuit of this invention functions to achieve this requirement by passing current through the motor auxiliary winding only a fractional portion of each half cycle of the alternating current passed through the motor main winding, which fractional portion thereby is effectively out of phase with the main winding current.

DESCRIPTION OF THE PREFERRED EMBODIMENT

Figure 1:
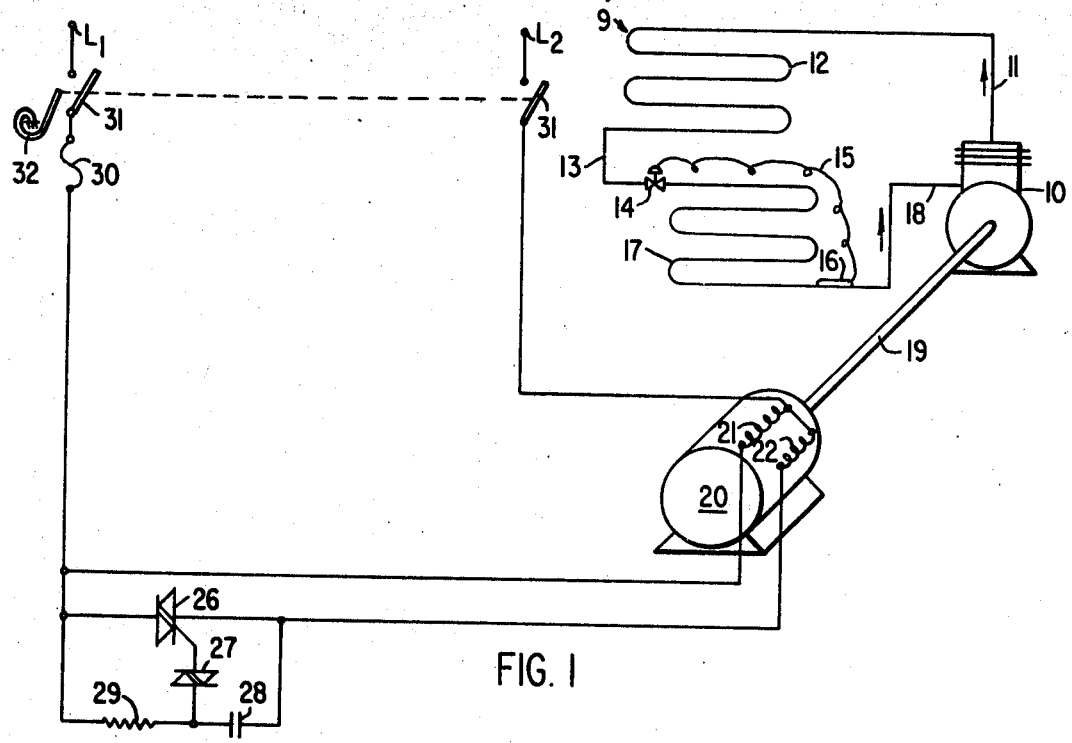
FIGURE 1 illustrates a diagrammatic view of a basic refrigeration system including an electrical control circuit for the compressor motor.

Referring particularly to FIGURE 1, there is shown a refrigeration system 9 employing a compressor 10, condenser 12, expansion means 14, and an evaporator 17. The compressor 10 is connected to condenser 12 by the discharge line 11; condenser 12 is connected to expansion means 14 by liquid line 13 and evaporator 17 is connected to compressor 10 by suction line 18 thereby completing the refrigerant flow path. Expansion means 14, in this instance a thermostatic expansion valve, is controlled by feeler bulb 16 located at the discharge of the evaporator 17 and is connected by means of a small diameter tube 15 to the valve. By employing a control arrangement of this nature, the thermostatic expansion valve further functions as a means for metering refrigerant flow.

Various single phase alternating current electrical motors have been employed for supplying power through a drive shaft 19 or other suitable coupling for refrigeration system components such as fans, compressors, pumps and the like. A preferred embodiment of this invention concerns the starting and running of a single phase alternating current compressor motor of a design similar to that of a permanent split capacitor motor. Such a motor has a main winding 21 and an auxiliary winding 22.

The main winding 21 is energized by the closing of line switch 31 by thermostatic control means 32 which is responsive to cooling demands in an area to be conditioned and passing single phase alternating current from line current source $L_1$, $L_2$ through motor current overload protection means 30. The auxiliary winding is energized by an alternating current obtained from a phase control circuit arrangement such as shown in FIGURE 1 which is out of phase with the source alternating current.

The phase control circuit here shown in FIGURE 1 preferably comprises a thyristor such as a triac 26, or other semiconductor switch of the type having a gate terminal for "triggering" the switch into a conductive state, connected in series with the motor auxiliary winding 22; a resistor 29 connected in series to a capacitor 28 and which are together connected in parallel across the triac 26; and a diac 27 or two terminal thyristor which has one terminal connected between resistor 29 and capacitor 28 and the other connected to the gate of triac 26. When the alternating voltage for each half cycle across capacitor 28 reaches the breakover voltage of the diac 27, capacitor 28 is partially discharged by the diac 27 into the gate of triac 26. This pulse triggers or "turns on" the triac 26 to a conductive state for the remainder of the half cycle, and the triac 26 passes a fractional portion of each half cycle of alternating current to the auxiliary winding which is thus out of phase with the supplied current. A characteristic of triacs to be noted is that once a triac is turned on, it remains in a conducting state until the applied alternating current goes to zero. Since the triac is a bidirectional conducting device it is again turned on in the opposite direction when triggered by diac 27 when the above triggering process is repeated for the negative half of each alternating current cycle. Resistor 29 cooperates with capacitor 28 in the phase control circuitry to determine the amount of phase displacement of the output current by setitng the period for reaching the breakover voltage of diac 27. Thus, phase control is accomplished by governing the point of each half cycle of the applied alternating current wave at which the triac 26 is triggered to a conductive state.

Figure 2:
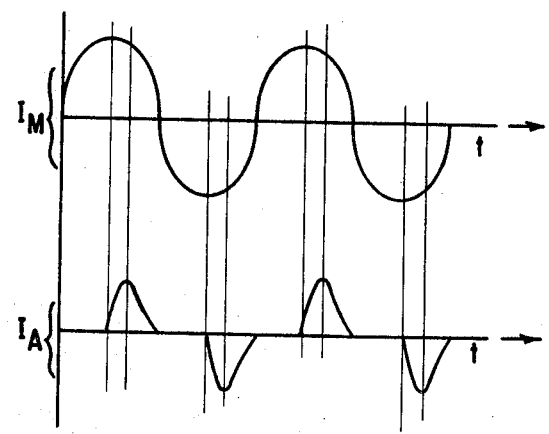
FIGURE 2 illustrates typical phase relationship of the current wave forms in the main winding and the auxiliary winding in accordance with the invention.

By applying the phase displaced output of the phase control circuit to the auxiliary winding 22 at the same time line alternating current is applied to main winding 21, two distinct magnetic fields are generated out of phase in time and apart in space. The wave forms of typical currents as applied to the main and auxiliary windings are shown in FIGURE 2 to illustrate the phase relationship. The top wave form represents a sinusoidal alternating current $I_M$ as applied to the main winding from the power source and the bottom wave form represents the current $I_A$ as applied to the auxiliary winding from the output of the phase control circuit. Since the phase control switch device is governed to conduct only a fractional portion of the applied line current, the resulting output is in the form of pulses as shown in the bottom wave form of FIGURE 2. In comparing the phase relationship of the currents applied to the main and auxiliary windings at the points of peak current for a reference point, it is readily observed that the peaks occur at different points in time for the same frequency. Hence the two currents differ in phase or are phase displaced. The magnetic fields generated by these phase displaced currents exist simultaneously in the motor windings and at any particular instant of time there is a resultant field having a magnitude based on the algebraic sum of the two fields. This resultant magnetic field rotates at a synchronous speed and simulates very closely the uniform rotating field of a true two-phase motor. The rotating magnetic field results in a torque that turns the motor rotor.

Under certain circumstances it may be desirable to include further circuit components in the design of a motor control to alter the application of phase control circuitry. For example, it is known that phase control is a highly efficient means of controlling average power to loads; therefore, by employing suitable switching components, the phase control circuit can be switched from the auxiliary winding of a motor after reaching full load speed to the motor main winding for controlling speed by controlling the input power.

When energizing the circuit of FIGURE 1 with a conventionally wound permanent split capacitor motor and varying the amount of chopping, or the amount of the incoming wave removed, it was found that with about 90% chopping the motor will start and run normally in the reverse direction, at about 50% chopping the motor will no start and at about 10% chopping the motor will start and run in the forward direction. Thus, by controlling the input to a motor by means of phase control the motor can be started in either direction.

While a preferred embodiment of this invention has been described for purposes of illustration, it will be understood that other electrical circuitry employing other electrical devices of well-known design may be used to obtain the control functions described herein. The illustrated refrigeration system may be of any desired type and it is contemplated that the present invention is not limited with respect to the basic refrigeration system illustrated. It will be understood that other motor driven refrigeration components such as fans, as well as other motor applications may be operated in accordance with the invention.

Other modifications and embodiments of this invention will be apparent within the scope of the following claims.

We claim:
1. A single phase alternating current motor starting and operating system comprising
   (A) an alternating current single phase motor having a main winding for operating said motor upon being energized by passage of an alternating current therethrough and having an auxiliary winding for starting and operating said motor upon being energized by passage of an alternating current therethrough out of phase with the alternating current supplied to said main winding;
   (B) circuit means adapted to be connected to a source of alternating current for connecting said main winding across said soucre of alternating current; and
   (C) phase control circuit means connected to said auxiliary winding for supplying current from said source to said auxiliary winding during only a fractional portion of each half cycle of the alternating current passed throuhg said main winding to said auxiliary winding, said fractional portion thereby being effectively out of phase with the alternating current supplied to said main windings, whereby a resultant torque is developed for starting and operating the motor, said phase control circuit comprising a bidirectional thyristor having a gate for triggering said thyristor into a conductive state to conduct current in either direction therethrough, said bidirectional thyristor being connected in series with said auxiliary winding across said main winding of said motor, a resistor and a capacitor connected in series directly across said bidirectional thyristor, and a diac directly connecting the gate of said bidirectional thyristor to the junction of said capacitor and said resistor for triggering said thyristor to a conductive state at a desired time in each half cycle of alternating current.

References Cited

UNITED STATES PATENTS 3,307,093  2/1967  Wright _____ 318—227 XR
1,861,091  5/1932  King _____ 62—228

OTHER REFERENCES

General Electric Publication, Application No. 11, "Using The triac For Control of A.C. Power," by J. H. Galloway, March 1966. Semiconductor Products Department, Syracuse, N.Y., 20 pages.

ORIS L. RADER, Primary Examiner

G. Z. RUBINSON, Assistant Examiner

U.S. Cl. X.R.

62—228; 318—227